US011714609B2

(12) United States Patent
Toub

(10) Patent No.: US 11,714,609 B2
(45) Date of Patent: Aug. 1, 2023

(54) AUTOMATIC GENERATION OF SOURCE CODE IMPLEMENTING A REGULAR EXPRESSION

(71) Applicant: Microsoft Technology Licensing, LLC, Redmond, WA (US)

(72) Inventor: Stephen Harris Toub, Winchester, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/538,700

(22) Filed: Nov. 30, 2021

(65) Prior Publication Data

US 2023/0176823 A1    Jun. 8, 2023

(51) Int. Cl.
G06F 8/72    (2018.01)
G06F 8/30    (2018.01)
G06F 8/41    (2018.01)
G06F 11/36    (2006.01)
G06F 8/73    (2018.01)
G06F 9/455    (2018.01)

(52) U.S. Cl.
CPC .............. G06F 8/315 (2013.01); G06F 8/443 (2013.01); G06F 8/72 (2013.01); G06F 8/73 (2013.01); G06F 9/45508 (2013.01); G06F 11/3624 (2013.01)

(58) Field of Classification Search
CPC . G06F 8/315; G06F 8/443; G06F 8/72; G06F 8/73; G06F 9/45508; G06F 11/3624
USPC ........................................................ 717/106
See application file for complete search history.

(56) References Cited

U.S. PATENT DOCUMENTS 8,171,452 B2 * 5/2012 Crasovan .................. G06F 8/36
717/111
8,615,750 B1 * 12/2013 Narayana Iyer .... G06F 11/3624
717/136
10,620,937 B1 * 4/2020 Brass ........................ G06F 8/38

(Continued)

OTHER PUBLICATIONS

Title: Inference of regular expressions for text extraction from examples, Author: A Bartoli, published on 2016.*

(Continued)

Primary Examiner — Chameli Das
(74) Attorney, Agent, or Firm — Workman Nydegger

(57) ABSTRACT

The present application discloses methods, systems, and computer program products for automatically generating source code implementing a regular expression. A regular expression that is defined within source code of an application project is identified. The source code uses a higher-level programming language. Based on identifying the regular expression, a source code implementation of the regular expression is automatically generated using the higher-level programming language, and the source code implementation of the regular expression is integrated into the application project. After integrating the source code implementation of the regular expression into the application project, the source code implementation of the regular expression is compiled into lower-level code and the lower-level code is emitted into an application executable when building the application project, or the source code implementation of the regular expression is interpreted when executing the application project.

18 Claims, 4 Drawing Sheets

(56) References Cited

U.S. PATENT DOCUMENTS

| | | | |
|---|---|---|---|
| 2003/0056083 A1* | 3/2003 | Bates ................. | G06F 8/443 |
| | | | 712/20 |
| 2010/0275192 A1* | 10/2010 | Serebryany ........... | G06F 8/443 |
| | | | 717/151 |
| 2012/0117551 A1* | 5/2012 | Isard .................. | G06F 8/4441 |
| | | | 717/159 |
| 2014/0137078 A1* | 5/2014 | Agha ................. | G06F 9/45516 |
| | | | 717/114 |
| 2018/0260198 A1* | 9/2018 | Hamby ............... | G06F 8/443 |

OTHER PUBLICATIONS

Title: Exploring regular expression evolution, Author P Wang published on 2019.*
Title: Automatic Java Code Generator for Regular Expressions and Finite Automata author: S Memeti published on 2012.*
Title: Exploring regular expression comprehension, author: C Chapman, published on 2017.*
Toub, et al., "Add initial regex source generator", Retrieved from: https://github.com/dotnet/runtime/pull/59186, Sep. 22, 2021, 9 Pages.

* cited by examiner

Integrated Development Environment - ConsoleApp   200a

File  Edit  View  Git  Project  Build  Debug  Test  Analyze  Tools  Extensions  Window  Help

Debug

Program.cs

```
1   using System;
2   using System.Text.RegularExpressions;
3
4   partial class Program
5   {
6       public static void Main() => Example().Match("hello");   — 203
7
8       [RegexGenerator(@"hello|hi")]
9
10      private static partial Regex Example();   — 204
11
12  }
```
201

RegexGenerato...cs [generated]

This file is auto-generated by the generator "System.Text.RegularExpressions.Generator.RegexGenerator"

```
30  */
31      base.pattern = "hello|hi";
32      base.roptions = (global::System.Text.RegularExpressions.RegexOptions)(8);
33      base.InternalMatchTimeout = global::System.Threading.Timeout.InfiniteTimeSpan;
34      base.factory = new RunnerFactory();
35      base.capsize = 1;
36      base.InitializeReferences();
37  }
38
39  private sealed class RunnerFactory : global::System.Text.RegularExpressions.RegexRunnerFac
40  {
41      protected override global::System.Text.RegularExpressions.RegexRunner CreateInstance()
42
```
202

Integrated Development Environment - ConsoleApp  — □ X

File  Edit  View  Git  Project  Build  Debug  Test  Analyze  Tools  Extensions  Window  Help

Debug  ■ ▲ | ← | ← | → •

Program.cs  X

```
1   using System;
2   using System.Text.RegularExpressions;
3
4   partial class Program
5   {
6       public static void Main() => Example().Match("hello");
7
8       [RegexGenerator(@"hello|hi")]
9
10      private static partial Regex Example();
11  }
12
```

RegexGenerato...cs [generated]  X

This file is auto-generated by the generator "System.Text.RegularExpressions.Generator.RegexGenerator"

```
30      */
31      base.pattern = "hello|hi";
32      base.roptions = (global::System.Text.RegularExpressions.RegexOptions)(8);
33      base.InternalMatchTimeout = global::System.Threading.Timeout.InfiniteTimeSpan;
34      base.factory = new RunnerFactory();
35      base.capsize = 1;
36      base.InitializeReferences();
37  }
38
39  private sealed class RunnerFactory : global::System.Text.RegularExpressions.RegexRunnerFac
40  {
41      protected override global::System.Text.RegularExpressions.RegexRunner CreateInstance()
42
```

Fig. 2B

AUTOMATIC GENERATION OF SOURCE CODE IMPLEMENTING A REGULAR EXPRESSION

BACKGROUND

In computing, regular expressions provide a succinct way to specify text to be searched for. In particular, a regular expression is a pattern that a regular expression engine attempts to match within input text. Each character in a regular expression is either a regular character that has a literal meaning, or a metacharacter having a special meaning (e.g., alternation, positioning, grouping, quantification, wildcards). The metacharacter syntax represents prescribed targets in a concise and flexible way to direct the automation of text processing of a variety of input data.

BRIEF SUMMARY

The inventor has recognized that, due to their succinct nature and use of metacharacter syntax, regular expressions can be cryptic and hard for even experienced developers to understand. Additionally, since they are processed by regular expression engines, the actual manner in which regular expressions are matched against input strings is opaque to developers. Thus, developers may not understand precisely how a particular regular expression works, or the matching performance characteristics of a particular regular expression. This can make regular expressions difficult to debug when used within a computer program and can make their matching performance unpredictable.

At least some embodiments described herein identify a regular expression within authored higher-level source code of an application project, and then automatically generate source code implementing that regular expression using the same higher-level programming language as the authored source code. Embodiments also integrate the automatically generated source code implementation of the regular expression into the application project. As such, the generated source code is persisted in the same manner as authored source code of the application project, is debuggable as part of the application project (e.g., using breakpoints, source code stepping, etc.), and is built into an application executable as opposed to using a regular expression engine.

By generating higher-level source code from regular expressions, the embodiments herein eliminate the opacity to developers with respect to how a particular regular expression will actually match a pattern to an input string. This can increase understanding of regular expressions, and lead to opportunities for authoring of regular expression that accomplish particular goals, while being more efficient than regular expressions that may have been otherwise chosen absent an understanding of how those regular expressions work in source code. Further, the higher-level source code generated from regular expressions, can be optimized, reused, debugged, profiled, and the like, just like any other high-level source code.

In some aspects, the techniques described herein relate to a method, implemented at a computer system that includes a processor, for automatically generating source code implementing a regular expression, the method including: identifying a regular expression that is defined within source code of an application project, the source code using a higher-level programming language; based on identifying the regular expression, automatically: generating a source code implementation of the regular expression using the higher-level programming language, and integrating the source code implementation of the regular expression into the application project; and after integrating the source code implementation of the regular expression into the application project, performing at least one of: based at least on building the application project into an application executable, compiling the source code implementation of the regular expression into lower-level code, and emitting the lower-level code into the application executable; or based at least on executing the application project, interpreting the source code implementation of the regular expression.

In some aspects, the techniques described herein relate to a computer system for automatically generating source code implementing a regular expression, including: a processor; and a computer storage media that stores computer-executable instructions that are executable by the processor to cause the computer system to at least: identify a regular expression that is defined within source code of an application project, the source code using a higher-level programming language; based on identifying the regular expression, automatically: generate a source code implementation of the regular expression using the higher-level programming language, and integrate the source code implementation of the regular expression into the application project; and after integrating the source code implementation of the regular expression into the application project, perform at least one of: based at least on building the application project into an application executable, compile the source code implementation of the regular expression into lower-level code, and emit the lower-level code into the application executable; or based at least on executing the application project, interpret the source code implementation of the regular expression.

In some aspects, the techniques described herein relate to a computer program product including a computer storage media that stores computer-executable instructions that are executable by a processor to cause a computer system to automatically generate source code implementing a regular expression, the computer-executable instructions including instructions that are executable by the processor to cause the computer system to at least: identify a regular expression that is defined within source code of an application project, the source code using a higher-level programming language; based on identifying the regular expression, automatically: generate a source code implementation of the regular expression using the higher-level programming language, and integrate the source code implementation of the regular expression into the application project; and after integrating the source code implementation of the regular expression into the application project, perform at least one of: based at least on building the application project into an application executable, compile the source code implementation of the regular expression into lower-level code, and emit the lower-level code into the application executable; or based at least on executing the application project, interpret the source code implementation of the regular expression.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A illustrates an example user interface of a development environment that automatically generates higher-level source code implementing a regular expression received as part of project source code;

FIG. 2B illustrates an example of debugging functionality within the user interface of FIG. 2A.

DETAILED DESCRIPTION

Figure 1:
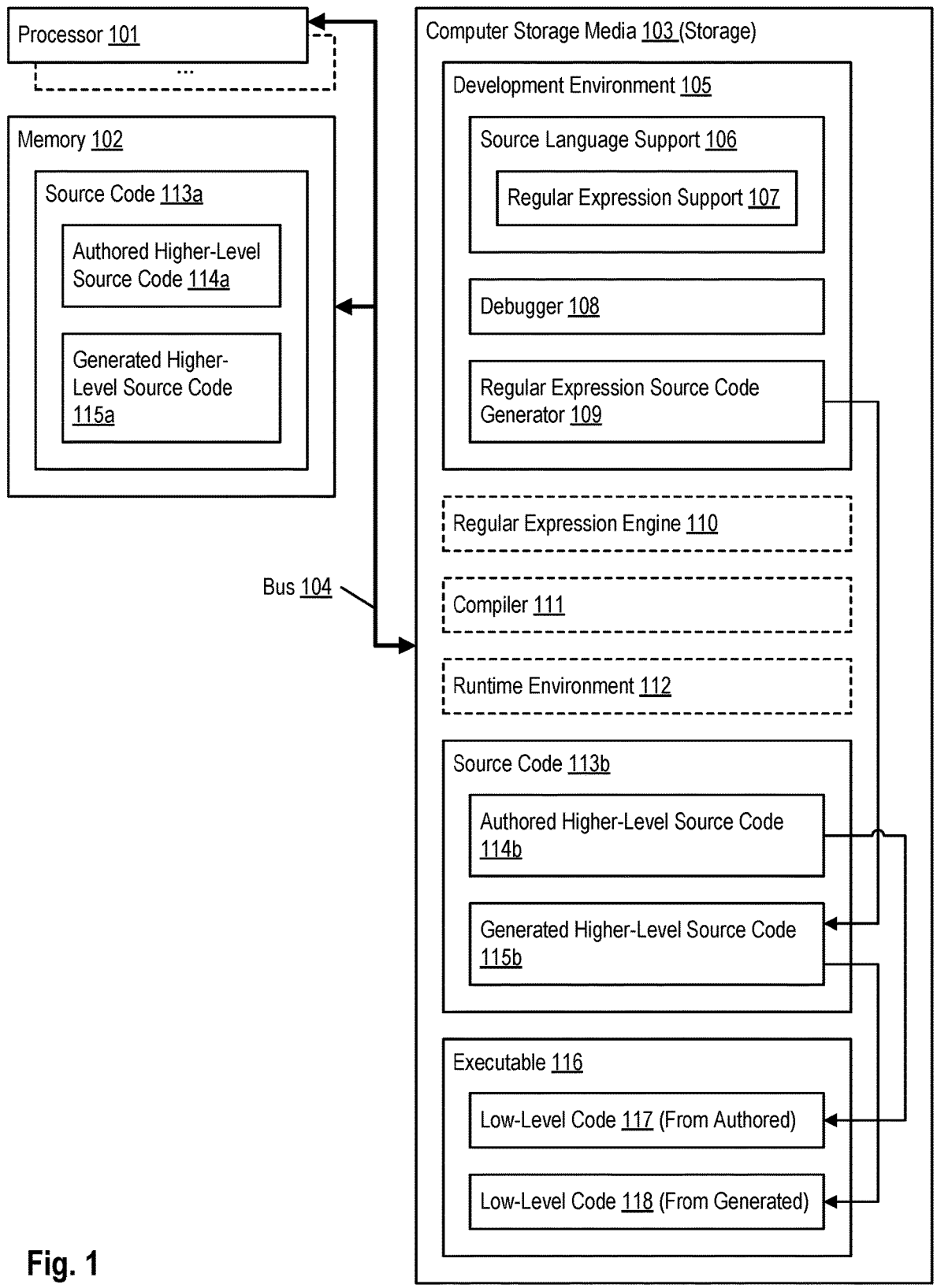
FIG. 1 illustrates an example computer system that facilitates automatic generation of source code implementing a regular expression.

FIG. 1 illustrates an example computer system 100 that facilitates automatic generation of source code implementing a regular expression. As shown, the computer system 100 includes a processor 101 (or a plurality of processors), at least one memory 102, and at least one computer storage media 103 (storage 103), each interconnected by a bus 104. The storage 103 includes a development environment 105. In embodiments, the development environment 105 is an integrated development environment (IDE), such as VISUAL STUDIO from MICROSOFT CORPORATION, ECLIPSE from INTERNATIONAL BUSINESS MACHINES, XCODE from APPLE CORPORATION, and the like.

In general, the development environment 105 facilitates creation of source code 113 of an application project. The source code 113 is a collection of code, with or without comments, written using a higher-level (i.e., human-readable) programming language, usually as plain text. As non-limiting examples, some common contemporary higher-level programming languages include C, C++, C#, SWIFT, JAVA, JAVASCRIPT, RUST, PYTHON, and GO. In some embodiments, the source code 113 is compiled by a compiler 111 into an application executable (executable 116) comprising lower-level (i.e., machine-readable) code. In embodiments, this compilation can occur "ahead-of-time" (e.g., to create a distributable executable) or "just-in-time" (e.g., to create executable code that is then executed as a result of the just-in-time execution). In other embodiments, the source code 113 is interpreted directly (e.g., in the case of JAVASCRIPT, PYTHON, and the like).

In embodiments, the lower-level code within the executable 116 comprises at least one of assembly code (i.e., machine code instructions) that is executable at the processor 101 directly, or intermediate language code. In embodiments, intermediate language code is later converted to assembly code, or interpreted, by a runtime environment 112 (e.g., the .NET runtime from MICROSOFT CORPORATION, the JAVA Virtual Machine from ORACLE CORPORATION, and the like).

In embodiments, once the source code 113 is compiled into an executable 116, the development environment 105 facilitates debugging execution of that executable 116 using a debugger 108, such as by enabling a user to set breakpoints in the source code 113, by enabling the user to step through the source code, etc.

As shown, the source code 113 may reside on one, or both, of the memory 102 (i.e., source code 113a) and the storage 103 (i.e., source code 113b). For example, the development environment 105 may initially store source code 113a within the memory 102, and then later persist it to the storage 103 as source code 113b. Either way, the source code 113 includes authored higher-level source code 114 (i.e., authored higher-level source code 114a in the memory 102, and/or authored higher-level source code 114b in the storage 103).

In embodiments, the development environment 105 assists in authoring of the source code 113 using source language support 106, which provides programming language assistance features for one or more programming languages, such as code completion, content assist (e.g., parameter information, member list information, etc.), code hinting, code syntax highlighting, and the like, when composing source code within an editor of the development environment 105.

As shown, the source language support 106 includes regular expression support 107 that enables regular expressions to be integrated into the authored higher-level source code 114. Classically, when an application's source code included a regular expression, regular expression support would, at build time, configure that application's corresponding executable to use a regular expression engine 110 to evaluate that regular expression. For example, when building the application's corresponding executable, prior regular expression support may have caused the compiler 111 to statically integrate the regular expression engine 110 into the executable directly, may have caused the compiler 111 to dynamically link the regular expression engine 110 to the executable as a dynamically-linked library, or may have caused the compiler 111 to configure the executable to rely on the regular expression engine 110 being integrated into the runtime environment 112.

In accordance with the embodiments herein, however, rather than configuring the executable 116 to use a regular expression engine 110 to evaluate regular expressions at runtime (e.g., as a statically or a dynamically-lined library, or as part of the runtime environment 112), the regular expression support 107 depicted in FIG. 1 converts regular expressions into higher-level source code that is integrated into an application's source code, and that is later built into the executable 116, or interpreted, just like the rest of the application's source code. In particular, upon identifying a regular expression that is defined within authored higher-level source code 114, the regular expression support 107 triggers a regular expression source code generator 109 to create generated higher-level source code 115 (i.e., generated higher-level source code 115a in the memory 102, and/or generated higher-level source code 115b in the storage 103) that implements a matching of that regular expression in the same high-level language as the authored higher-level source code 114, and integrates that generated higher-level source code 115 into the source code 113. Thus, when building the source code 113 into the executable 116, the compiler 111 generates both (1) low-level code 117 from the authored higher-level source code 114, and (2) low-level code 118 from the generated higher-level source code 115. Alternatively, when interpreting the source code 113, a runtime environment 112 interprets the generated higher-level source code 115 along with the authored higher-level source code 114.

In general, the regular expression source code generator 109 creates the generated higher-level source code 115 based on a regular expression pattern defined in the authored higher-level source code 114. Additionally, the regular expression source code generator 109 may also generate the generated higher-level source code 115 based on one or more additional inputs, such as a set of one or more regular expression options (e.g., RegexOptions.IgnoreCase in C#), a timeout, a globalization culture used for case-insensitive operations, and the like.

As mentioned, the regular expression source code generator 109 creates generated higher-level source code 115, which is inherently (i.e., by design) human readable. However, in embodiments the regular expression source code generator 109 takes particular action to increase the readability of generated higher-level source code 115.

In one example, the regular expression source code generator 109 inserts one or more characters into the generated higher-level source code 115 that are not strictly necessary for building of the generated higher-level source code 115, but which are configured to increase readability of the generated higher-level source code 115. Thus, the regular expression source code generator 109 may create generated higher-level source code 115 that occupies more memory or disk space than is strictly required, in favor of increasing readability of that generated higher-level source code 115. For example, the regular expression source code generator 109 may insert a comment that explains a portion of the generated higher-level source code 115, may insert a scoping operator that provides structure to the generated higher-level source code 115, may insert a whitespace character (e.g., a space or a tab) that provides visual structure to the generated higher-level source code 115, etc.

In another example, the regular expression source code generator 109 chooses a code construct or algorithm that is easier for humans to understand than some other code construct or algorithm. For instance, the regular expression source code generator 109 may choose to use a switch instead of a cascading series of if/else if/else blocks, may choose to use a character directly rather than an index to an array element storing the character, etc. In some embodiments, the regular expression source code generator 109 specifically uses a code construct or algorithm within the generated higher-level source code 115 that is less efficient that an alternate code construct or algorithm, in favor of increasing readability of the generated higher-level source code 115. Additionally, in some embodiments the regular expression source code generator 109 emits code patterns that are close in nature to what a developer would author themselves. As will be appreciated, matching coding patterns to what a developer would author improves readability of the generated higher-level source code 115. Additionally, in embodiments the compiler 111 is tuned to code patterns that developers commonly author, and thus matching coding patterns to what a developer would author when creating the generated higher-level source code 115 makes it more likely that the compiler 111 will efficiently compile the generated higher-level source code 115 into low-level code 118 and/or emit low-level code 118 that is optimized.

FIG. 2A illustrates an example 200*a* showing an example user interface of development environment 105, which automatically generates higher-level source code implementing a regular expression received as part of project source code. In example 200*a*, the example user interface includes a first source code buffer 201 corresponding to a source code file (i.e., Program.cs) as part of the source code 113 of an application project (i.e., "ConsoleApp") being authored within development environment 105. As an example, the first source code buffer 201 defines at least a portion of authored higher-level source code 114.

In example 200*a*, the authored higher-level source code 114 is authored using the C# programming language and includes a regular expression definition 203 defining the matching pattern "hello|hi". Here, the regular expression definition 203 is a C# attribute defining metadata for a function declaration 204 of the function Example(). Notably, this is only one example syntax for defining a regular expression definition, and it will be appreciated that a variety of syntax could be used-both within the C# programming language, and within a variety of other programming languages. As such, the embodiments described herein are not limited to the syntax of the illustrated examples.

In example 200*a*, the example user interface includes a second source code buffer 202 corresponding to automatically generated code for implementing the function Example(). As an example, the second source code buffer 202 defines at least a portion of generated higher-level source code 115. In embodiments, the contents of the second source code buffer 202 are generated by the regular expression source code generator 109, based on detection of the regular expression definition 203 by the regular expression support 107. In example 200*a*, the generated higher-level source code 115 uses the C# programming language, which is the same programming language used by the authored higher-level source code 114.

It will be appreciated by one of ordinary skill in the art that, when the function Example() is called (e.g., at line 6 of first source code buffer 201), the function matches the matching pattern of regular expression definition 203 using generated higher-level source code 115 that is generated by the regular expression source code generator 109, rather than using a regular expression engine 110. This generated higher-level source code 115 is human-readable, idiomatic to the authored higher-level source code 114, and fully usable higher-level source code tuned to the specified matching pattern of the regular expression definition 203. The generated higher-level source code 115 is immediately buildable into the executable 116 (i.e., as low-level code 118), and can also be copy/pasted for use in other areas of the authored higher-level source code 114 (or in an entirely different application project that uses the same high-level programming language).

Since the generated higher-level source code 115 is idiomatic, reading to the developer as if they had written it by hand, the embodiments herein provide not only a build-time solution that enables faster startup time and more opportunity for optimization, but also a learning experience that helps the developer understand how the regular expression defined in the regular expression definition 203 translates into real code.

In embodiments, the generation of the generated higher-level source code 115 within second source code buffer 202 is performed automatically, as a developer enters the regular expression definition 203. Thus, for example, if the developer modifies the regular expression definition 203 (e.g., by changing the matching pattern), then the regular expression support 107 recognizes that modification, and the regular expression source code generator 109 automatically re-generates the generated higher-level source code 115 within second source code buffer 202 accordingly.

Additionally, since the generated higher-level source code 115 is source code, the entire facility of the debugger 108 is available for use with the generated higher-level source code 115. For example, the debugger 108 can be used to query for values of variables in the generated higher-level source code 115 for the regular expression; to easily set breakpoints in, and step through, execution of generated higher-level source code 115 for the regular expression (e.g., when the function Example() is called); and the like-something not previously possible when using a regular expression engine 110 at runtime. For example, FIG. 2B illustrates an example 200b of debugging functionality within the user interface of example 200a. In particular, example 200b shows a first user interface element 205 (i.e., a circle) indicating that a breakpoint has been set on line 6 of the first source code buffer 201, corresponding to an invocation the function Example(). When hitting this breakpoint, execution of the generated higher-level source code 115 within the second source code buffer 202 can be stepped through using step controls of a debugging toolbar 207. For example, example 200b also shows a second user interface element 206 (i.e., an arrow) indicating a current line (i.e., line 40) within the second source code buffer 202 at which execution is paused based on the breakpoint, and based on use of the step controls of the debugging toolbar 207.

Components of the computer system 100 are now further described in connection with FIG. 3, which illustrates a flow chart of an example method 300 for automatically generating source code implementing a regular expression. In embodiments, instructions for implementing method 300 are encoded as computer-executable instructions stored on a computer program product (e.g., storage 103) that are executable by a processor (e.g., processor 101) to cause a computer system (e.g., computer system 100) to perform method 300.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 3:
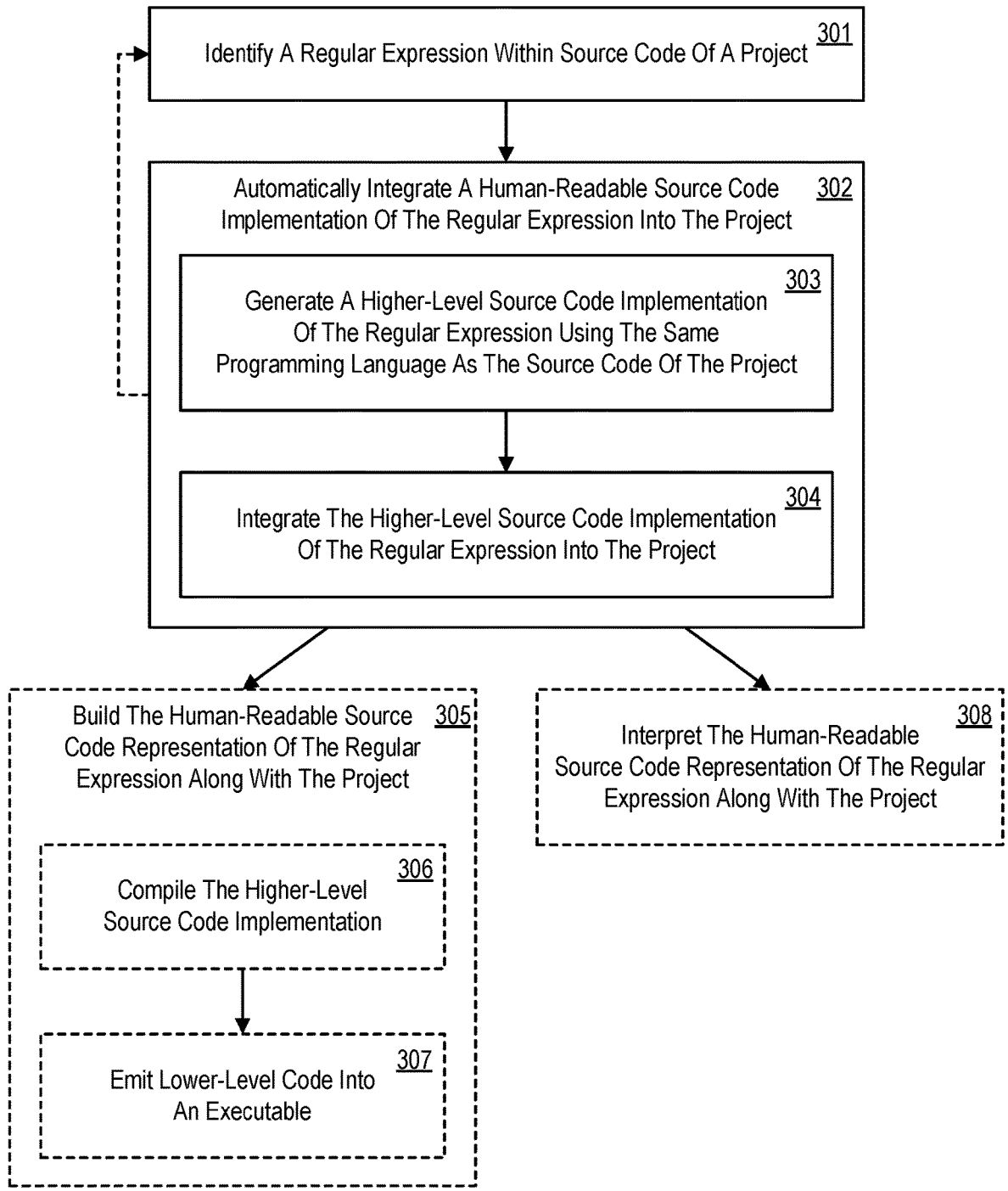
FIG. 3 illustrates a flow chart of an example method for automatically generating source code implementing a regular expression.

Referring to FIG. 3, method 300 comprises an act 301 of identifying a regular expression within source code of a project. In embodiments act 301 comprises identifying a regular expression that is defined within source code of an application project, the source code using a higher-level programming language. In an example, during editing of the authored higher-level source code 114 by a developer within the first source code buffer 201, the regular expression support 107 detects completion of the regular expression definition 203, which defines the matching pattern of "hello|hi". As mentioned, source code is a collection of code, with or without comments, written using a higher-level (i.e., human-readable) programming language, with examples of contemporary higher-level programming languages including C, C++, C#, SWIFT, JAVA, JAVASCRIPT, RUST, PYTHON, and GO. Thus, in embodiments of method 300, the higher-level programming language comprises one of C, C++, C#, SWIFT, JAVA, JAVASCRIPT, RUST, PYTHON, or GO. However, method 300 is not limited to these programming languages.

Referring to FIG. 3, method 300 also comprises an act 302 of automatically integrating a human-readable source code implementation of the regular expression into the project. As shown, act 302 comprises an act 303 of generating a higher-level source code implementation of the regular expression using the same programming language as the source code of the project, and an act 304 of integrating the higher-level source code implementation of the regular expression into the project.

Referring first to act 303, in embodiments act 303 comprises, based on identifying the regular expression, automatically generating a source code implementation of the regular expression using the higher-level programming language. In an example, based on the regular expression support 107 identifying the regular expression definition 203 within the authored higher-level source code 114 (e.g., first source code buffer 201), the regular expression source code generator 109 generates higher-level source code implementing the regular expression using the same higher-level programming language that was used by the authored higher-level source code 114.

Referring to act 304, in embodiments act 304 comprises, based on identifying the regular expression, automatically integrating the source code implementation of the regular expression into the application project. In an example, the regular expression source code generator 109 inserts the higher-level source code generated in act 303 into the source code 113 as at least a portion of the generated higher-level source code 115.

As described in connection with FIG. 2A, in example 200a this portion of the generated higher-level source code 115 is integrated as an implementation of the function Example(), as shown in the second source code buffer 202. Thus, in embodiments of act 304, integrating the source code implementation of the regular expression into the application project comprises integrating the source code implementation of the regular expression as a function implementation.

As mentioned, in embodiments the regular expression source code generator 109 takes particular actions to increase the readability of generated higher-level source code, such as to insert a comment that explains a portion of the generated source code, to insert a scoping operator that provides structure to the generated source code, to insert a whitespace character that provides visual structure to the generated source code, to use a code construct that is easier for humans to understand than some other code construct, to use an algorithm that is easier for humans to understand than some other algorithm, etc. For example, in example 200a, the second source code buffer 202 includes scoping operators (e.g., "{" and "}"), indentations (e.g., spaces or tabs), and newlines. Thus, in embodiments of act 304 generating the source code implementation of the regular expression using the higher-level programming language comprises generating at least one of: a comment that explains the source code implementation of the regular expression, a scoping operator configured to increase readability of the source code implementation of the regular expression, a white space character configured to increase readability of the source code implementation of the regular expression, a code construct configured to increase readability of the source code implementation of the regular expression, or an algorithm configured to increase readability of the source code implementation of the regular expression.

Referring to FIG. 3, in embodiments, after integrating the source code implementation of the regular expression into the application project in act 304, method 300 also comprises at least one of an act 305 of building the human-readable source code representation of the regular expression along with the project, or an act 308 of interpreting the human-readable source code representation of the regular expression along with the project.

As shown, when included, act 305 comprises an act 306 of compiling the higher-level source code implementation, and an act 307 of emitting lower-level code into an executable. Referring first to act 306, in embodiments act 306 comprises, based at least on building the application project into an application executable, compiling the source code implementation of the regular expression into lower-level code. In an example, the compiler 111 compiles source code 113. As shown in FIG. 1, this includes generating low-level code 117 from the authored higher-level source code 114 and generating low-level code 118 from the generated higher-level source code 115.

As mentioned, compilation can occur ahead-of-time or just-in-time. Thus, in embodiments of act 306, compiling the source code implementation of the regular expression into the lower-level code is one of an ahead-of-time compilation or a just-in-time compilation.

As mentioned, the lower-level code comprises at least one of assembly code (i.e., machine code instructions) that is executable at the processor 101 directly, or intermediate language code that is executable via a runtime environment 112. Thus, in embodiments of act 306, the lower-level code comprises at least one of intermediate language code or assembly code.

As will be appreciated, when compiling source code, compilers frequently apply one or more optimizations when converting higher-level source code to lower-level code. For example, optimizing compilers often operate by using one or more optimizing transformations, which are algorithms that take program source code and transform it to produce a semantically equivalent output that uses fewer resources or executes faster. Common optimizing transformations include local optimizations (i.e., optimizing within basic blocks), global optimizations (e.g., intraprocedural methods that act on whole functions), loop optimizations (e.g., moving statements or expressions outside the body of a loop without affecting the semantics of the program), and the like. Thus, in embodiments of act 306, compiling the source code implementation of the regular expression into the lower-level code includes applying at least one optimizing transformation. In embodiments, when the executable 116 comprises intermediate language code, the runtime environment 112 may apply further optimizations when producing assembly code from the intermediate language code.

Referring to act 307, in embodiments act 307 comprises, based at least on building the application project into an application executable, emitting the lower-level code into the application executable. In an example, the compiler 111 emits the generated higher-level source code 115 generated in act 306 into executable 116.

When included, act 308 comprises, based at least on executing the application project, interpreting the source code implementation of the regular expression. In an example, the runtime environment 112 interprets source code 113-including both authored higher-level source code 114 and generated higher-level source code 115.

In FIG. 3, there is a broken arrow from act 302 to act 301, indicating that method 300 can operate to identify and automatically generate higher-level source code for one or more additional regular expressions prior to act 305 and/or act 308. Thus, in embodiments, act 301 and act 302 are repeated for at least one additional regular expression.

Additionally, the broken arrow from act 302 to act 301 indicates that method 300 can operate to identify modifications to already identified regular expressions and re-generate corresponding higher-level source code prior to act 305 and/or act 308. Thus, in embodiments method 300 also comprises detecting a user modification to the regular expression; and based on detecting the user modification to the regular expression, automatically re-generating the source code implementation of the regular expression using the higher-level programming language to include the user modification.

In some embodiments, the development environment 105 enables a developer to edit the generated higher-level source code 115. For example, in embodiments, a developer can edit the generated source code within the second source code buffer 202 and/or the developer can copy the generated source code from the second source code buffer 202 and paste that source code to another buffer and edit the source code in this other buffer. Thus, in embodiments method 300 also comprises applying a user edit to the source code implementation of the regular expression prior to compiling the source code implementation of the regular expression into the lower-level code.

As demonstrated in connection with example 200b, since the generated higher-level source code 115 is source code, the debugger 108 can be used to easily set breakpoints in, and step through, execution of the regular expression (e.g., to step through the generated higher-level source code within the second source code buffer 202). Thus, in embodiments method 300 also comprises at least one of: setting a breakpoint in the source code implementation of the regular expression in a debugger; or stepping through execution of the source code implementation of the regular expression in the debugger.

Accordingly, the embodiments described herein identify a regular expression within authored higher-level source code of an application project, and then automatically generate source code implementing that regular expression using the same higher-level programming language as the authored source code. The embodiments described herein also integrate the automatically generated source code implementation of the regular expression into the application project. As such, the generated source code is persisted in the same manner as authored source code of the application project, is debuggable as part of the application project (e.g., using breakpoints, source code stepping, etc.), and is built into an application executable. This eliminates opacity to developers with respect to how a particular regular expression will actually match a pattern to an input string, which can increase understanding of regular expressions and lead to opportunities for authoring of regular expression that accomplish particular goals while being more efficient than regular expressions that may have been otherwise chosen absent an understanding of how those regular expressions work in source code. Further, the higher-level source code generated from regular expressions, can be optimized, reused, debugged, profiled, and the like, just like any other high-level source code.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (computer system 100) that includes computer hardware, such as, for example, one or more processors (processor 101) and system memory (memory 102), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (storage 103). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:
1. A method, implemented at a computer system that includes a processor, for automatically generating source code implementing a regular expression, the method comprising:

identifying a regular expression that is defined within source code of an application project, the source code using a higher-level programming language, the regular expression defining a pattern for matching against an input text and including (1) a regular character having a literal meaning, and (2) a metacharacter specifying at least one of alternation, positioning, grouping, quantification, or wildcard;

based on identifying the regular expression, automatically:
  generating a source code implementation of the regular expression using the higher-level programming language,
  detecting a user modification to the regular expression,
  based on detecting the user modification to the regular expression, automatically re-generating the source code implementation of the regular expression using the higher-level programming language to include the user modification, and
  after re-generating the source code implementation of the regular expression, integrating the source code implementation of the regular expression into the application project; and
after integrating the source code implementation of the regular expression into the application project, performing at least one of:
  based at least on building the application project into an application executable, compiling the source code implementation of the regular expression into lower-level code, and emitting the lower-level code into the application executable; or
  based at least on executing the application project, interpreting the source code implementation of the regular expression.

2. The method of claim 1, wherein the method comprises compiling the source code implementation of the regular expression into the lower-level code, and wherein the lower-level code comprises at least one of intermediate language code or assembly code.

3. The method of claim 1, further comprising at least one of:
  setting a breakpoint in the source code implementation of the regular expression in a debugger; or
  stepping through execution of the source code implementation of the regular expression in the debugger.

4. The method of claim 1, further comprising applying a user edit to the source code implementation of the regular expression prior to compiling the source code implementation of the regular expression into the lower-level code.

5. The method of claim 1, wherein the method comprises compiling the source code implementation of the regular expression into the lower-level code, and wherein compiling the source code implementation of the regular expression into the lower-level code includes applying at least one optimization transformation.

6. The method of claim 1, wherein the method comprises compiling the source code implementation of the regular expression into the lower-level code, and wherein compiling the source code implementation of the regular expression into the lower-level code is one of an ahead-of-time compilation or a just-in-time compilation.

7. The method of claim 1, wherein generating the source code implementation of the regular expression using the higher-level programming language comprises generating at least one of:
  a comment that explains the source code implementation of the regular expression,
  a scoping operator configured to increase readability of the source code implementation of the regular expression,
  a white space character configured to increase readability of the source code implementation of the regular expression,
  a code construct configured to increase readability of the source code implementation of the regular expression, or
  an algorithm configured to increase readability of the source code implementation of the regular expression.

8. The method of claim 1, wherein integrating the source code implementation of the regular expression into the application project comprises integrating the source code implementation of the regular expression as a function implementation.

9. The method of claim 1, wherein the method comprises interpreting the source code implementation of the regular expression.

10. A computer system for automatically generating source code implementing a regular expression, comprising:
  a processor; and
  a computer storage media that stores computer-executable instructions that are executable by the processor to cause the computer system to at least:
    identify a regular expression that is defined within source code of an application project, the source code using a higher-level programming language, the regular expression defining a pattern for matching against an input text and including (1) a regular character having a literal meaning, and (2) a metacharacter specifying at least one of alternation, positioning, grouping, quantification, or wildcard;
    based on identifying the regular expression, automatically:
      generate a source code implementation of the regular expression using the higher-level programming language,
      detect a user modification to the regular expression, based on detecting the user modification to the regular expression, automatically re-generate the source code implementation of the regular expression using the higher-level programming language to include the user modification, and
      after re-generating the source code implementation of the regular expression, integrate the source code implementation of the regular expression into the application project; and
    after integrating the source code implementation of the regular expression into the application project, perform at least one of:
      based at least on building the application project into an application executable, compile the source code implementation of the regular expression into lower-level code, and emit the lower-level code into the application executable; or
      based at least on executing the application project, interpret the source code implementation of the regular expression.

11. The computer system of claim 10, wherein the computer system compiles the source code implementation of the regular expression into the lower-level code, and wherein the lower-level code comprises at least one of intermediate language code or assembly code.

12. The computer system of claim 10, the computer-executable instructions also including instructions that are executable by the processor to cause the computer system to:

set a breakpoint in the source code implementation of the regular expression in a debugger; or step through execution of the source code implementation of the regular expression in the debugger.

13. The computer system of claim 10, the computer-executable instructions also including instructions that are executable by the processor to cause the computer system to apply a user edit to the source code implementation of the regular expression prior to compiling the source code implementation of the regular expression into the lower-level code.

14. The computer system of claim 10, wherein the computer system compiles the source code implementation of the regular expression into the lower-level code, and wherein compiling the source code implementation of the regular expression into the lower-level code includes applying at least one optimization transformation.

15. The computer system of claim 10, wherein the computer system compiles the source code implementation of the regular expression into the lower-level code, and wherein compiling the source code implementation of the regular expression into the lower-level code is one of an ahead-of-time compilation or a just-in-time compilation.

16. The computer system of claim 10, wherein generating the source code implementation of the regular expression using the higher-level programming language comprises generating at least one of:
   a comment that explains the source code implementation of the regular expression,
   a scoping operator configured to increase readability of the source code implementation of the regular expression,
   a white space character configured to increase readability of the source code implementation of the regular expression,
   a code construct configured to increase readability of the source code implementation of the regular expression, or
   an algorithm configured to increase readability of the source code implementation of the regular expression.

17. The computer system of claim 10, wherein integrating the source code implementation of the regular expression into the application project comprises integrating the source code implementation of the regular expression as a function implementation.

18. A computer program product comprising a hardware storage device that stores computer-executable instructions that are executable by a processor to cause a computer system to automatically generate source code implementing a regular expression, the computer-executable instructions including instructions that are executable by the processor to cause the computer system to at least:
   identify a regular expression that is defined within source code of an application project, the source code using a higher-level programming language, the regular expression defining a pattern for matching against an input text and including (1) a regular character having a literal meaning, and (2) a metacharacter specifying at least one of alternation, positioning, grouping, quantification, or wildcard;
   based on identifying the regular expression, automatically:
      generate a source code implementation of the regular expression using the higher-level programming language,
      detect a user modification to the regular expression,
      based on detecting the user modification to the regular expression, automatically re-generate the source code implementation of the regular expression using the higher-level programming language to include the user modification, and
      after re-generating the source code implementation of the regular expression, integrate the source code implementation of the regular expression into the application project; and
   after integrating the source code implementation of the regular expression into the application project, perform at least one of:
      based at least on building the application project into an application executable, compile the source code implementation of the regular expression into lower-level code, and emit the lower-level code into the application executable; or
      based at least on executing the application project, interpret the source code implementation of the regular expression.

* * * * *